United States Patent [19]

Kunioka et al.

[11] Patent Number: 4,532,105
[45] Date of Patent: Jul. 30, 1985

[54] CASTING ALLOY RESISTANT TO CORROSION AND WEAR AT ELEVATED TEMPERATURES

[75] Inventors: Saburo Kunioka, Kawagoe; Kiwamu Okuma, Kooriyama; Tsunehiro Haga, Tokyo; Hatsuo Kawaguti, Saitama, all of Japan

[73] Assignees: Shinokoku Steel Corporation, Kawagoe; Nitto Boseki Co., Ltd., Fukushima; Paramount Glass Mfg., Co., Ltd., Kooriyama, all of Japan

[21] Appl. No.: 614,992

[22] Filed: May 29, 1984

Related U.S. Application Data

[63] Continuation-in-part of Ser. No. 422,963, Sep. 24, 1982, abandoned.

[30] Foreign Application Priority Data

Dec. 8, 1981 [JP] Japan .................. 56-197121

[51] Int. Cl.³ .............................................. C22C 19/05
[52] U.S. Cl. ................................................. 420/451
[58] Field of Search ................ 420/451, 453; 148/427

[56] References Cited

U.S. PATENT DOCUMENTS 4,153,455  5/1979  Eiselstein et al. ............... 420/448

FOREIGN PATENT DOCUMENTS 54349     7/1980   Australia.
1812162   7/1969   Fed. Rep. of Germany.
2080414  11/1971   France.
2216237   8/1974   France.

Primary Examiner—R. Dean
Attorney, Agent, or Firm—Frishauf, Holtz, Goodman and Woodward

[57] ABSTRACT

A high temperature corrosion-resistant and wear-resistant casting alloy used for preparing rotatory cylinder of glass fibers spinning, which consists essentially of 0.08 to 0.8% of C, 15 to 35% of Cr, 1 to 5.5% of W, 0.10 to 0.25% of Ti, 0.10 to 0.25% of Zr, about 1% of Nb, and the remainder constituted by Ni and impurities unavoidably carried into the alloy.

2 Claims, 2 Drawing Figures

CASTING ALLOY RESISTANT TO CORROSION AND WEAR AT ELEVATED TEMPERATURES

CROSS-REFERENCE TO RELATED APPLICATION

This application is a continuation-in-part of our copending patent application Ser. No. 422,963 filed Sept. 24, 1982, now abandoned, and assigned to the same assignees as the parent application.

BACKGROUND OF THE INVENTION

This invention relates to an alloy resistant to corrosion and wear at an elevated temperature which is used for making of a cast rotatory cylinder, that is, a kind of spinner, applied to the manufacture of glass fiber by ejecting hot molten glass with an accelerated centrifugal force through fine orifices bored in the lateral wall of the rotatory cylinder. A structure of the rotatory spinner is shown in U.S. Pat. No. 4,392,878.

The rotatory cylinder applied to the manufacture of glass fiber with a centrifugal force is itself highly heated in the air atmosphere and is rotated at such a high speed as 2,000 r.p.m. Further, molten glass flows out quickly through fine orifices bored in the lateral wall of the rotatory cylinder. Therefore, the following characteristics are demanded of an alloy constituting the rotatory cylinder.

1. The alloy should have such an elevated temperature mechanical strength as can withstand the centrifugal force resulting from the high speed rotation.
2. The alloy should fully withstand the frictional wear caused by the quick flow of molten glass through the orifices.
3. The alloy should have sufficient oxidation resistance at elevated temperatures.
4. The alloy should be fully resistant to corrosion with respect to the molten glass.
5. An oxide layer unavoidably deposited on the surface of alloy should have prominent corrosion resistance with respect to the molten glass.

The known alloys constituting the rotatory cylinder include a Ni-Cr alloy containing one or both of Co and W (set forth, for example, in U.S. Pat. Nos. 3,010,201, 3,318,694 and 3,806,338); a Co-Cr alloy containing one or both of W and Ni (disclosed, for example, in U.S. Pat. No. 3,933,484); and a Fe-Ni-Cr alloy (for example, SUS 310).

Among the above-listed alloys, however, SUS 310 used as a material of the rotatory cylinder alloy has so extremely a short life as deserves no consideration at all. The above-mentioned Ni-Cr alloy containing Co and/or W and Co-Cr alloy containing W and/or Ni involves a large amount of expensive Co or W in order to precede particularly elevated temperature mechanical strength from among the various characteristics demanded of the alloy. Therefore, such alloy has such a drawback as its manufacturing cost being increased, and the alloy itself and the oxide layer deposited thereon losing corrosion resistance with respect to the molten glass. These result in a decline in the durability of the rotatory cylinder.

SUMMARY OF THE INVENTION

It is accordingly the object of this invention to provide an alloy for the manufacture of an inexpensive rotatory cylinder which is freed of costly Co, and has a decidedly more prominent durability than the conventional rotatory cylinder even under the rigid condition in which the rotatory cylinder is rotated at high speed in contact with the hot molten glass.

The alloy, embodying this invention, resistant to corrosion and wear at an elevated temperature of more than 1,000° C. is characterized in that it consists essentially of 0.08 to 0.8% by weight of C, 15 to 35% by weight of Cr, 1 to 5.5% by weight of W, 0.10 to 0.25% by weight of Ti, 0.10 to 0.25% by weight of Zr, about 1% by weight of Nb, and the remainder constituted by Ni and impurities unavoidably carried into the alloy. Further, if necessary, it is possible to add 2.0 or less % by weight of Si and/or 2.0 or less % by weight of Mn as deoxidizer to the above-mentioned composition.

DETAILED DESCRIPTION OF THE PREFERRED EMBODIMENT

Description is now given of the reasons why limitations are imposed on the contents of the respective components of an alloy embodying this invention.

C constitutes a solid solution together with a base metal or a carbide together with Cr or W, and contributes to the elevation of mechanical strength or wear resistance of the subject alloy at an elevated temperature. When the content of C increases over the prescribed level, the alloy shows lower machinability, presenting difficulties in drilling the small orifices through which the molten glass is ejected. Further, when the C content is too high, carbides with Cr or W are produced excessively, resulting in that the Cr content in the matrix decreases and also the alloy loses homogeneity of the structure of the matrix, and consequently a decline in the corrosion resistance of the alloy with respect to the molten glass.

Figure 1:
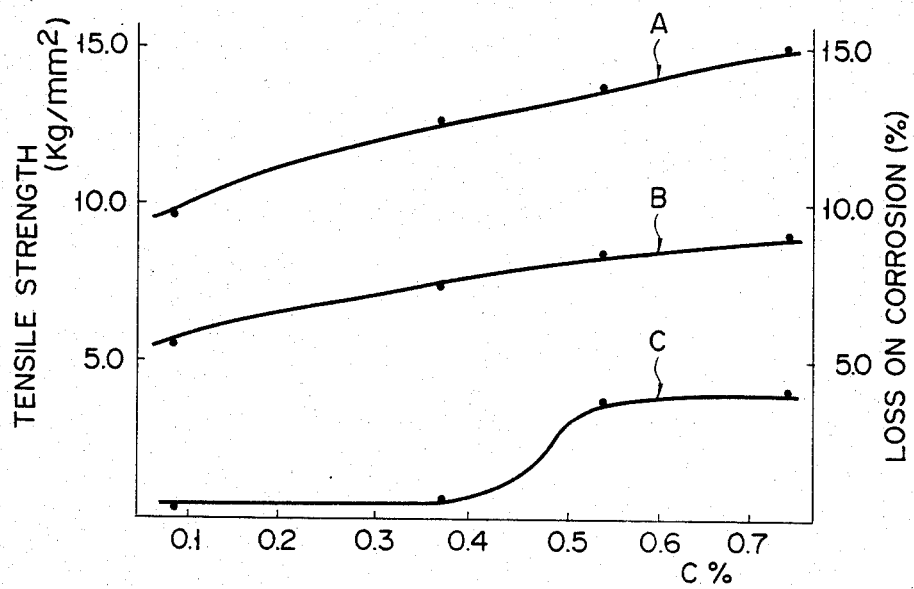
FIG. 1 is a curve diagram showing the effects of the content of C on the elevated temperature tensile strength of an alloy of this invention and also on its corrosion resistance with respect to molten glass.

The curve diagram of FIG. 1 indicates the effects of C content on the elevated temperature tensile strength of the alloy of this invention and also on its corrosion resistance with respect to molten glass. In FIG. 1, curve A denotes the tensile strength of the alloy at 1,000° C.; curve B shows the tensile strength of the alloy at 1,100° C.; and curve C represents the weight loss on corrosion of the alloy caused by contact of 240 hours with molten glass standing still at 1,140° C.

The curve diagram of FIG. 1 shows that an alloy containing 0.4 to 0.5% by weight of C indicates only a slight weight loss on corrosion as about 4%, though somewhat decreasing in corrosion resistance. Such weight loss raises no practical problem. Therefore, the lower limit to the C content in the alloy of this invention has been set at 0.08% from the curve diagram of FIG. 1. The upper limit to the C content has be chosen to be 0.8% from the standpoint of assuming the machinability of the alloy.

Si is added to the alloy, if required to control the extent of its deoxidation. However, an excess addition of Si leads to the decreased toughness of the alloy, and also the reduced corrosion resistance of not only the alloy itself but also an oxide layer unavoidably deposited on the surface of the alloy with respect to the molten glass. For the object of this invention, therefore, the upper limit to the Si content has been set at 2.0%, though the lower limit to the Si content is not particularly defined. Obviously, Si need not be added, if occasion demands.

Mn is also added to the alloy, if required to control the extent of its deoxidation. However, an excess addition of Mn leads to a decline in the oxidation resistance of the alloy at an elevated temperature. For the object of this invention, therefore, the upper limit of the Mn content has been chosen to be 2.0%, though the lower limit to the Mn content is not specified as in the case of the aforementioned Si content.

Cr constitutes a solid solution together with the base metal of the subject alloy, or a carbide together with C, thereby elevating the resistances of the alloy to frictional wear and oxidation. The apertured rotatory cylinder itself allowing for the ejection of molten glass is heated often higher temperature of more than 1,000° C. In this case, it is necessary to add at least 15% by weight of Cr in order to suppress a decline in the durability of the rotatory cylinder caused by the deposition of scale on its surface. However, an excess content of Cr is accompanied with the drawback that an acidic oxide such as $Cr_2O_3$ grows on the surface of the alloy, and the inevitably reduced content of Ni renders the alloy less corrosion-resistant with respect to the molten glass. From the above-mentioned consideration, the upper limit of the Cr content has been set at 35% by weight.

W constitutes a solid solution together with the base metal of the subject alloy or a carbide together with C, thereby increasing the elevated temperature mechanical strength of the alloy and its frictional wear resistance. However, the excess content of W prominently reduces the corrosion resistance of the alloy with respect to the molten glass and the elevated temperature oxidation resistance of the alloy.

Figure 2:
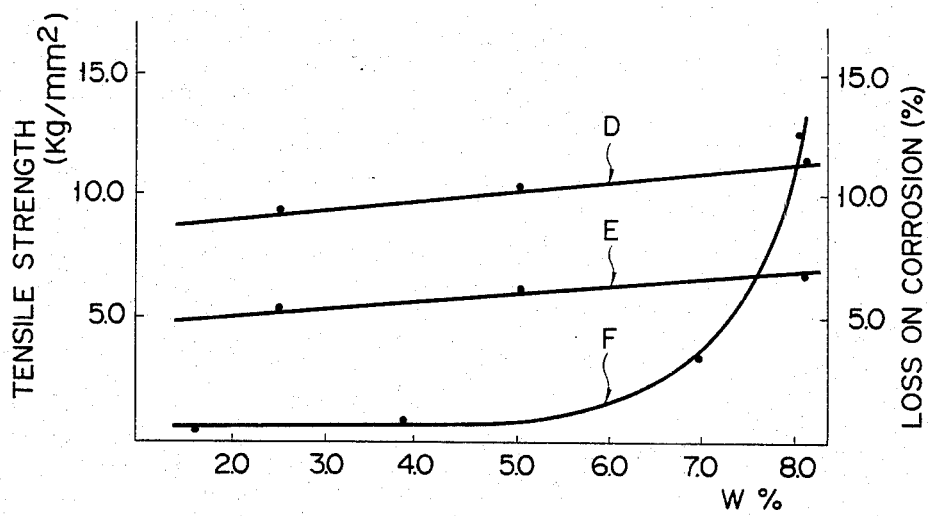
FIG. 2 is a curve diagram showing the effects of the content of W on the elevated temperature tensile strength of an alloy of this invention and also on its corrosion resistance with respect to molten glass.

The curve diagram of FIG. 2 indicates the effects of W content on the elevated temperature tensile strength of an alloy of this invention and also on its corrosion resistance with respect to the molten glass. In FIG. 2, curve D shows the tensile strength of an alloy at 1,000° C.; curve E represents the tensile strength of the alloy at 1,100° C.; and curve F denotes the weight loss on corrosion of the alloy caused by contact of 240 hours with the molten glass standing still at 1,140° C.

The curve diagram of FIG. 2 proves that the addition of a large amount of W prominently reduces the corrosion resistance of the alloy with respect to the molten glass. As described, however, with respect to the requirement of limiting the C content, the 4% weight loss on corrosion of the alloy, or the W content up to 5.5% raises no practical problem. Therefore, the limit to W content has been chosen to range between 1 to 5.5% by weight from the result shown in FIG. 2.

Ti, Zr and Nb respectively constitute a granular carbide together with C. These carbides are characterized in that they are little dissolved in the base metal of the alloy even at high temperature, and elevate the mechanical strength and frictional wear resistance of the alloy at high temperature. Further, these carbides prevent C from forming a mesh-like carbide together with Cr, thereby effectively increasing the toughness of the alloy. However, the excess content of these elements gives rise to complication in the melting process of the alloy, and does not indicate an appreciable effect of addition despite the expensiveness of these elements. For the object of this invention, therefore, the coexisting contents of these elements are limited to 0.10 to 0.25% by weight of Ti, 0.10 to 0.25 weight % by Zr and about 1% by weight of Nb as is apparent from the data of the exemplified alloys reported in Tables 1 and 2 hereinafter.

Ni is the base element of the alloy of this invention. The reason is that the apertured rotatory cylinder allowing for the ejection of molten glass is applied at a high temperature of more than 1,000° C. If the base element of the alloy consists of Fe, then the alloy will have insufficient elevated temperature mechanical strength and corrosion resistance with respect to the molten glass. Further, if the base element is formed of Co, then the alloy will not only have insufficient corrosion resistance, but also undesirably become appreciably expensive.

For the object of this invention, therefore, it has been decided to use Ni in such amount as corresponds to the remainder arrived at by subtracting the amounts of the additive elements which should be added as the components of the subject alloy and the elements of impurity unavoidably carried into said alloy from the total weight thereof. The elements of impurity include, for instance, Fe, P, S or Cu.

EXAMPLES

This invention will become more apparent from the following examples.

Description is now given collectively of the characteristics of alloys embodying this invention with reference to some examples. Table 1 indicates the compositions of the alloys used as the examples and also those of the conventional alloys used as the controls.

The alloys listed in Table 1 were used in providing:

(1) test pieces for measuring elevated temperature tensile strength in accordance with the provision of JIS G 0567;

(2) test pieces for measuring corrosiveness at an elevated temperature which have respectively thickness of 5 mm, width of 15 mm and length of 50 mm; and (3) molten glass ejecting cast rotatory cylinders having outer diameter of 300 mm, height of 50 mm and side wall thickness of 3 mm, and thousands of orifices.

The tests for elevated temperature tensile strength were carried out respectively with the straining rate of 5% per minute at 1,000° C. and 1,100° C.

The tests for elevated temperature corrosion were carried out effected by dipping these test pieces in a bath of molten glass at 1,140° C. for 240 hours.

Running tests involving the ejection of molten glass were undertaken by controlling the average temperature of the outer peripheral wall of apertured rotatory cylinder to about 1,010° C., rotating said cylinder at a speed of 2,500 to 2,100 r.p.m., and ejecting the molten glass into fibers through the orifices. By these running tests, the durability, that is, an average effective life of hours of the respective rotatory cylinder was determined.

Table 2 indicates the results of the above-mentioned tests along with the characteristics of the control alloys collected from the published literature.

As seen from Table 2, the alloys embodying this invention have such elevated temperature mechanical strength as in 1.5 to 3.0 times higher than that of SUS 310 stainless steel which is regarded as a most common heat resistant alloy. Further, the apertured rotatory cylinders prepared from the alloys of this invention have respective durability about 10 times greater than the rotatory cylinder formed of SUS 310 stainless steel. Furthermore, the rotatory cylinders embodying this invention have a durability 1.5 to 3.0 times greater than that of cylinder prepared from the alloys set forth in the known literature.

TABLE 1

| Elements | Compositions of alloys (%) | | | | | | | | | | |
|---|---|---|---|---|---|---|---|---|---|---|---|
| | C | Si | Mn | Cr | W | Ti | Nb | Zr | Ni | Fe | Ta |
| Example alloys | | | | | | | | | | | |
| Example No. 1 | 0.08 | 0.60 | 0.62 | 28.2 | 5.1 | 0.23 | 1.05 | 0.25 | Remainder | — | — |
| Example No. 2 | 0.74 | 0.55 | 0.61 | 28.5 | 5.3 | 0.23 | 1.02 | 0.25 | " | — | — |
| Example No. 3 | 0.21 | 0.60 | 0.58 | 27.5 | 2.5 | 0.25 | 1.06 | 0.21 | " | — | — |
| Example No. 4 | 0.39 | 0.57 | 0.58 | 28.6 | 5.4 | 0.10 | 0.97 | 0.12 | " | — | — |
| Example No. 5 | 0.35 | 0.64 | 0.68 | 34.2 | 5.2 | 0.26 | 1.07 | 0.23 | " | — | — |
| Example No. 6 | 0.10 | 0.62 | 0.65 | 15.5 | 5.0 | 0.22 | 1.02 | 0.23 | " | — | — |
| Example No. 7 | 0.12 | 0.68 | 0.64 | 28.4 | 1.3 | 0.24 | 0.98 | 0.21 | " | — | — |
| Control alloys | | | | | | | | | | | |
| SUS 310 | 0.08 | 1.50 | 2.00 | 24.0 | — | — | — | — | 22.0 | 40.4 | — |
| U.S. Pat. No. 3,010,201 | 0.56 | 1.06 | 1.02 | 26.8 | 5.6 | — | — | — | 52.0 | 13.0 | — |
| U.S. Pat. No. 3,318,694 | 0.25 | 1.25 | 0.20 | 34.3 | 3.0 | Mo 3.0 | — | — | 52.0 | 5.0 | 1.0 |
| U.S. Pat. No. 3,806,338 | 0.35 | 1.00 | 0.20 | 34.5 | 8.0 | — | — | 0.50 | 54.7 | — | 0.8 |
| U.S. Pat. No. 3,933,484 | 0.58 | 0.38 | — | 31.2 | 6.5 | Fe 0.32 | B 0.03 | 0.01 | 10.4 | Co Remainder | 2.8 |

TABLE 2

| Characteristics | Characteristics of alloys | | | | |
|---|---|---|---|---|---|
| | Tensile strength (kg/mm²) | | Hardness (HRB) | Corrosion-resistance (%/240 hrs.) | Average life (hours) |
| | 1,000° C. | 1,100° C. | | | |
| Sample alloys | | | | | |
| Example No. 1 | 10.1 | 6.1 | 78 | 3.5 | 300 to 350 |
| Example No. 2 | 15.0 | 9.0 | 98 | 3.7 | 300 to 350 |
| Example No. 3 | 11.8 | 7.3 | 89 | 2.4 | 320 to 350 |
| Example No. 4 | 13.4 | 7.9 | 91 | 2.8 | 320 to 350 |
| Example No. 5 | 12.8 | 8.5 | 91 | 2.4 | 320 to 350 |
| Example No. 6 | 9.8 | 6.8 | 76 | 2.6 | 300 to 350 |
| Example No. 7 | 8.9 | 5.2 | 76 | 2.0 | 280 to 350 |
| Control alloys | | | | | |
| SUS 310 | 5.4 | 4.0 | 85 | — | 25 to 30 |
| U.S. Pat. No. 3,010,201 | No data | No data | 88 | No data | 120 to 150 |
| U.S. Pat. No. 3,318,694 | " | " | No data | 0.5% (2 hrs.) | 107 |
| U.S. Pat. No. 3,806,338 | " | " | " | No data | 214 |
| U.S. Pat. No. 3,933,484 | " | " | 109 | 0.302 g (40 hrs.) | 227 to 252 |

What is claimed is:

1. A high temperature corrosion-resistant and wear-resistant casting alloy used for preparing rotatory cylinder of glass fibers spinning which consists essentially of 0.08 to 0.8 percent by weight of C, 15 to 35 percent by weight of Cr, 1 to 5.5 percent by weight of W, 0.10 to 0.25% by weight of Ti, 0.10 to 0.25% by weight of Zr, about 1 percent by weight of Nb, and the remainder constituted by Ni and impurities unavoidably carried into the alloy.

2. The alloy according to claim 1, which further contains at least one deoxidizer selected from the group consisting of 2.0 percent by weight or less of Si and 2.0 percent by weight or less of Mn.

* * * * *

UNITED STATES PATENT AND TRADEMARK OFFICE
CERTIFICATE OF CORRECTION

PATENT NO. : 4,532,105
DATED : July 30, 1985
INVENTOR(S) : Saburo KUNIOKA et al

It is certified that error appears in the above-identified patent and that said Letters Patent is hereby corrected as shown below:

On the initial page of the patent, next to the designation "Assignees:" the first listed Assignee should read --Shinhokoku Steel Corporation--.

*Signed and Sealed this*

*Twenty-eighth* Day of *January 1986*

[SEAL]

Attest:

DONALD J. QUIGG

*Attesting Officer*  *Commissioner of Patents and Trademarks*